United States Patent [19]

Hehl

[11] 4,025,264

[45] May 24, 1977

[54] DIE CLOSING UNIT WITH RETRACTABLE TIE RODS

[76] Inventor: Karl Hehl, Arthur-Hehl-Str. 32, 7298 Lossburg, Germany

[22] Filed: Dec. 15, 1975

[21] Appl. No.: 640,531

Related U.S. Application Data

[63] Continuation-in-part of Ser. No. 569,886, April 21, 1975, abandoned.

[30] Foreign Application Priority Data

Dec. 13, 1974 Germany .......................... 2459025

[52] U.S. Cl. .......................... 425/190; 425/242 R; 425/450.1; 425/DIG. 223
[51] Int. Cl.² .......................... B29F 1/00; B29C 3/02
[58] Field of Search ............ 425/242 R, 190, 450.1, 425/451.2, DIG. 223

[56] References Cited

UNITED STATES PATENTS

| 3,433,290 | 3/1969 | Eggenberger et al. ...... 425/242 R X |
| 3,465,387 | 9/1969 | Allard et al. ............... 425/DIG. 23 |
| 3,669,599 | 6/1972 | Snider et al. ................... 425/242 R |
| 3,729,283 | 4/1973 | Eggenberger et al. ...... 425/242 R X |
| 3,801,256 | 4/1974 | Farrell ....................... 425/242 R X |
| 3,882,588 | 5/1975 | McFalls et al. ................ 425/190 X |

FOREIGN PATENTS OR APPLICATIONS 1,090,094  9/1960  Germany ........................ 425/450.1

*Primary Examiner*—J. Howard Flint, Jr.
*Attorney, Agent, or Firm*—Joseph A. Geiger

[57] ABSTRACT

A die closing unit for an injection molding machine, where the closing force is provided by either push-type or pull-type hydraulic cylinders, the die closing unit having in each case a movable die carrier member and a stationary die carrier member and two or four tie rods rigidly connected to one member, while guidingly engaging the other, the tie rods being releasable at their connections and retractable for the emplacement of an injection molding of enlarged contour.

18 Claims, 12 Drawing Figures

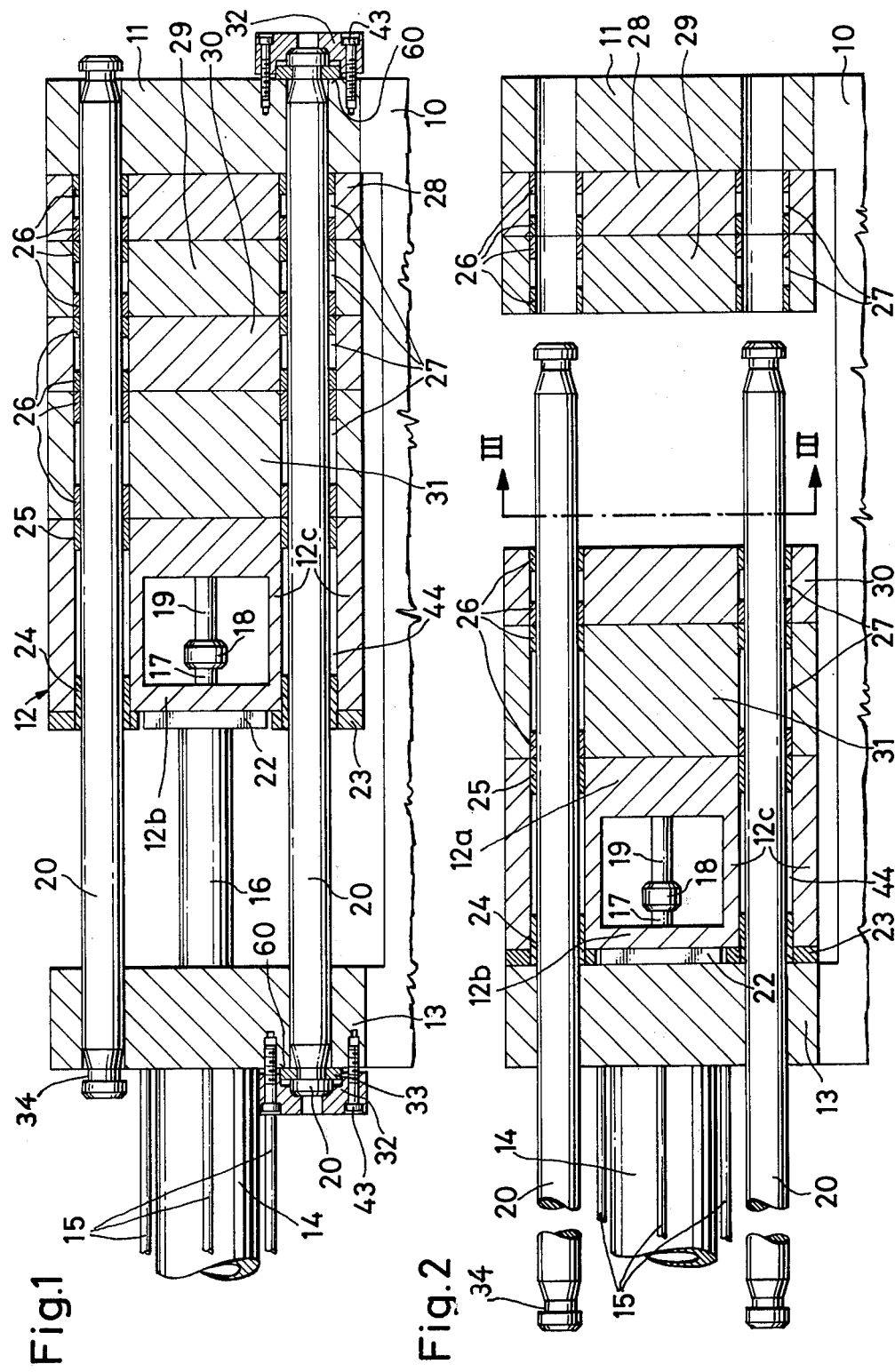

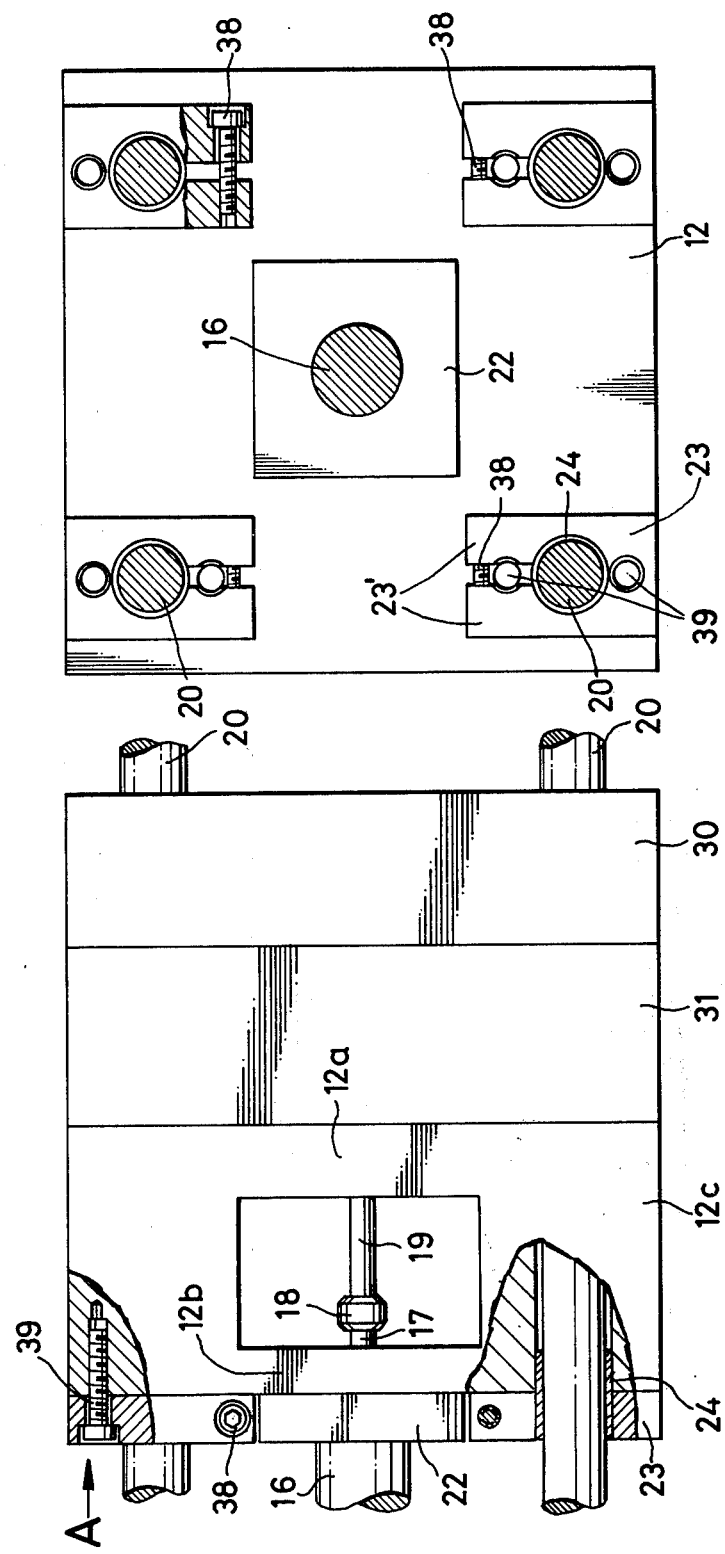

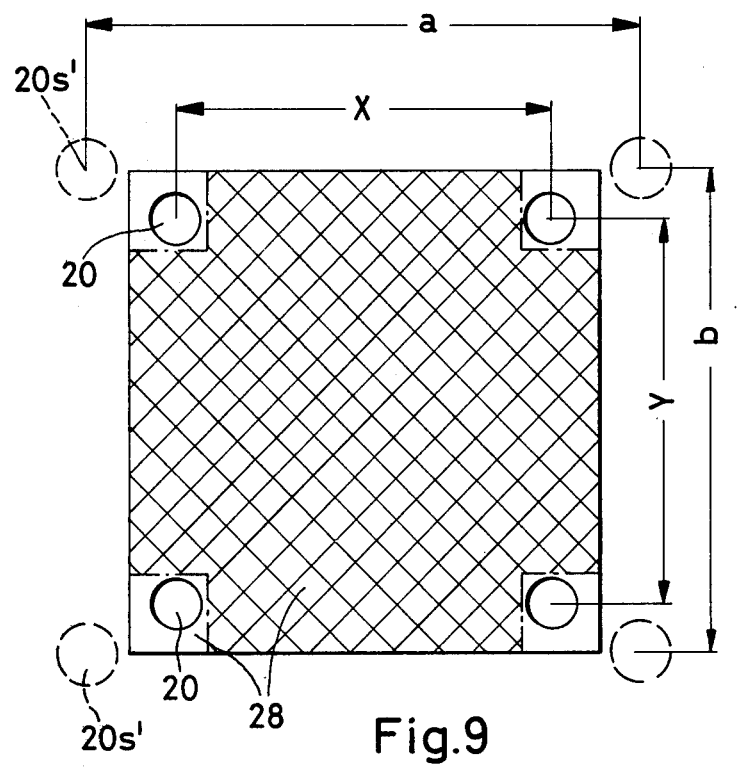
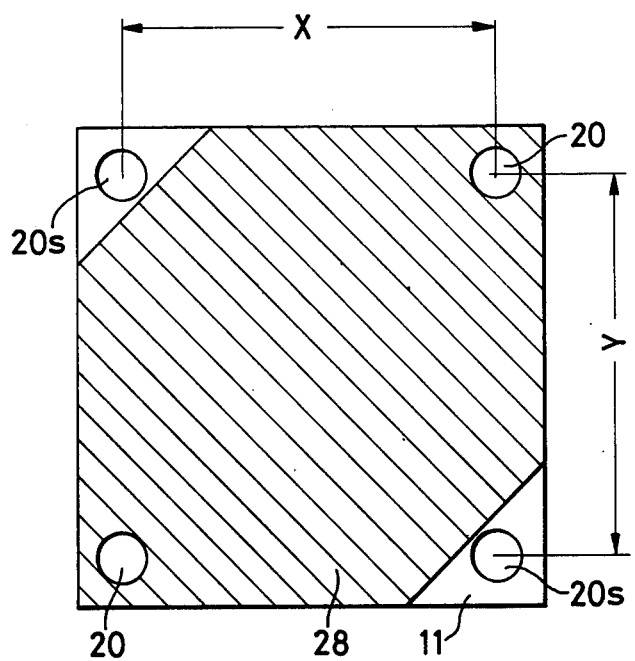

DIE CLOSING UNIT WITH RETRACTABLE TIE RODS

RELATED APPLICATION

This application is a continuation-in-part of my copending application, Ser. No. 569,886 filed Apr. 21, 1975, now abandoned, and of which a continuation was filed on May 25, 1976, under Ser. No. 689,813.

BACKGROUND OF THE INVENTION

1. Field of the Invention

The present invention relates to machines for the injection-molding of plastic or metallic parts and articles, and more particularly to the die closing units of such injection molding machines by means of which injection molding dies are opened and closed and maintained in the closed position under elevated closing pressure, through the action of one or several hydraulic cylinders.

2. Description of the Prior Art

An injection molding die can either be pushed closed or pulled closed. Accordingly, one distinguishes among the die closing units of injection molding machines between push-type die closing units and pull-type die closing units. In both cases, the injection molding die, which normally consists of two die halves, is mounted on and between two die carrier plates or blocks of which one is normally stationary and the other is longitudinally movable.

In the push-type die closing unit, the hydraulic cylinder, or cylinders, are arranged longitudinally behind the movable die carrier plate, pushing the later against the stationary die carrier plate, thereby closing the molding die between them. In order to obtain the necessary rigidity in such a structural configuration, and in order to minimize the strain on the supporting machine frame, this type of die closing unit has at least two tie rods extending between the stationary die carrier and the stationary part of the hydraulic cylinder unit, thereby eliminating any bending moment on the supporting machine frame. These tie rods, either two or four of them, are parallel longitudinally extending rods surrounding the injection molding die.

In the case of a pull-type closing unit, the hydraulic cylinder, or cylinders, are arranged longitudinally behind the stationary die carrier plate, reaching beyond the injection molding die to the movable die carrier plate, and pulling the latter towards the stationary die carrier plate in the die closing sense. Normally, it is the piston rods of the hydraulic cylinders which are extended longitudinally to reach all the way to the movable die carrier plate. Accordingly, such a die closing unit has almost always two or four hydraulic cylinders whose elongated piston rods serve as tie rods in the sense of transmitting pulling forces between the die carrying members of the die closing unit.

It can therefore be seen that the two basic types of die closing units have in common that their longitudinally oppositely positioned die carrier plates are linked together by means of rod members whose longitudinal tension equals the closing pressure which is to be generated on the injection molding die, especially during the injection operation, when plastified raw material is injected into the closed injection molding die at high pressure. In the context of this disclosure, therefore, these rod members will be generally referred to as tie rods, whether they are in fact longitudinally moving piston rods or stationary rods extending between two stationary members of the die closing unit.

An injection molding die is commonly composed of at least two heavy plates which are mounted axially between the stationary and movable die carrier plates, in the space between the tie rods; at least two such tie rods are always present. Between the several separable die plates are arranged suitable guide means and/or centering means, mostly axially protruding pilot members in one plate engaging matching recesses in the adjoining plate. Since it is a general requirement that the injection molding dies are removable from their respective die carrier plates, either for servicing or for replacement with a different die assembly, the outside dimensions of these die assemblies are determined by the access space which is available between the longitudinal tie rods. It follows that the transverse distance between the tie rods constitutes a dimensional limitation on the dimensions of the injection molding die, and hence on the effectively available cross-sectional area of the injection molding cavity. This limitation applies to at least one dimensional axis in the case of only two tie rods, but it limits both axes in the case of four tie rods. The maximum acceptable dimensions of the injection molding die are thus considerably reduced from the dimensions of the die carrier plates. The reverse distances between the tie rods, on the other hand, cannot be increased at will, because this would require larger and much heavier die carrier plates and, in the case of the pull-type die closing unit, a larger heavier cylinder mount, because the several hydraulic cylinders are normally arranged inside an integrally cast block.

The prior art in this field, therefore, was limited to the use of injection molding dies whose dimension along at least one axis was determined by the transverse opening between two tie rods (see German Pat. No. 1,300,201). An improved utilization of space is suggested in the German Pat. No. 1,265,390, where the space between the tie rods is utilized more efficiently, by combining the guide elements with the centering elements in a coaxial arrangement. A common shortcoming of these past attempts at a better utilization of the die mounting space in die closing units is that they fail to utilize that area which lies outside the area defined by an extension of the maximum opening between the tie rods, because the die plates have to be inserted through that opening.

SUMMARY OF THE INVENTION

Underlying the present invention is the primary objective of devising an improvement in connection with the earlier-described die closing units which makes it possible to insert and remove from the die closing unit a set of injection molding dies of larger effective cross-sectional area, without increasing the die closing unit itself in terms of the spacing between its tie rods.

The effectively available cross-sectional area of an injection molding die is that the area which can be used for the location of the mold cavities in the die plates.

The present invention proposes to attain the above objective by suggesting an improved die closing unit in which the tie rods are so arranged that at least one of them can be quickly disconnected from its associated die carrier plate, or stationary plate, for an axial separation therefrom, and that the tie rod, or rods, are thereupon retractable axially over at least part of the length of the die closing unit, for the transverse insertion and removal of injection molding die plates.

This improvement is particularly advantageous in connection with die closing units having four tie rods whose axes are equidistant with respect to each other and with respect to the longitudinal center axis of the die closing unit. The retractability of only one out of the four tie rods makes it possible to insert a much larger injection molding die, because the available opening is no longer equal to the distance between two circumferentially adjacent tie rods, but is now equal to the distance between two diametrically opposite tie rods. Since the diagonal of a square is equal to 1.41 times its side, the diametrical spacing is 41 percent greater than the circumferential spacing. But, because the tie rod diameter has to be deducted from this spacing in both cases, the actual gain is at least 50 percent or more.

In most applications of the present invention, it is preferable to arrange all tie rods for retractability in at least one axial direction. Where the die closing unit is of the pull-type, with the piston rods serving as tie rods, simultaneous retractability of all tie rods from the movable die carrier plate is normally required, because retraction is accomplished through the actuation of the hydraulic cylinders. Where the die closing unit is of the push-type, retractability may be provided in one or both axial directions.

By way of a preferred embodiment, the invention suggests tie rods having at least one extremity connected to the associated die carrier plate or thrust plate in such a way that the surface portions of the tie rod over which axial forces are transmitted between the plate and the tie rod are located entirely within the diameter of the tie rod with which it engages a matching bore in the plate. The preferred embodiment further suggests that these force transmitting axial surfaces of the tie rod be arranged on the same side of the die carrier plate, i.e. on its outer side, in the axial sense. The suggested tie rods, accordingly, have a continuous diameter over their entire length, except for a groove near their extremities, a radial flank of the groove representing one axial force transmitting face, and the end face of the rod representing the other axial force transmitting face. It follows that the tie rod bores of the associated plate have a diameter which is equal to the maximum diameter of the tie rods, making it possible to retract the latter in either direction.

One preferred embodiment of the invention offers an additional advantage in that the retractable tie rods also serve as guide means and centering means for the plates of the injection molding die. In this case, the die plates are preferably fitted with guide bushings engaging the tie rods with minimal clearance.

In connection with the push-type die closing unit, where the tie rods are stationary, the present invention further suggests a means for using the movable die carrier and the hydraulic drive to retract the tie rods. While there is normally a sliding engagement between the stationary tie rods and the movable die carrier, the latter carries clamping collars which, when tightened, clamp the tie rods to the movable die carrier. The retracting movement can then be performed with the hydraulic cylinder, or cylinders, of the die closing unit.

BRIEF DESCRIPTION OF THE DRAWINGS

Further special features and advantages of the invention will become apparent from the description following below, when taken together with the accompanying drawings which illustrate, by way of example, several embodiments of the invention, represented in the various figures as follows:

FIG. 1 represents a first embodiment of the invention in the form of a push-type die closing unit which is shown in partial longitudinal cross section, with the hydraulic drive partially removed, the injection molding die being shown closed;

FIG. 2 shows the die closing unit of FIG. 1 in the open position, the tie rods having been retracted in the course of the opening motion;

FIG. 5 shows the parts of FIG. 4, with different details emphasized by partial cross section;

FIG. 6 is an end view of the die carrier frame of FIGS. 4 and 5, as seen in the direction A;

FIG. 9 shows schematically the cross-sectional positions of four tie rods of a die closing unit of the invention in relation to the peripheral outline of an injection molding die;

FIG. 10 shows an arrangement similar to FIG. 9 with a modified injection molding die;

DESCRIPTION OF THE PREFERRED EMBODIMENT

Figure 4:
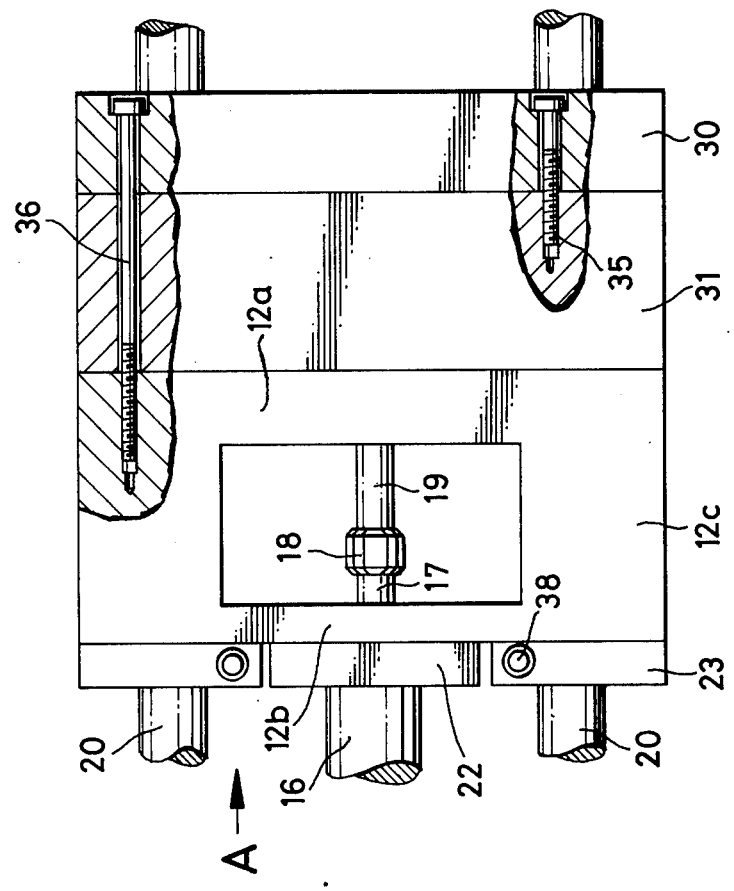
FIG. 4 is an enlarged front view of a portion of the die closing unit of FIG. 1, showing the movable die carrier frame and its attached die plates.

Referring to FIGS. 1 through 6 of the drawing, there is illustrated a die closing unit representing a first embodiment of the invention. As can be seen in FIG. 1, the die closing unit is supported by a machine base 10. The stationary parts by which the die closing unit is mounted to the base 10 consist essentially of a stationary die carrier plate 11 at the forward end of the assembly. Between the two stationary plates extend four parallel equidistant tie rods 20, reaching through bores of both stationary plates and being attached thereto in a manner to be described in detail further below. The stationary plates 11 and 13 and the four tie rods 20 thus form a rigid support and guide frame for a movable die carrier frame 12 which embraces the tie rods by means of suitable guide bores holding guide bushings 24 and 25. Between the stationary die carrier plate 11 and the movable die carrier frame 12 is arranged an injection molding die consisting of four separate plates 28, 29, 30, and 31 of which the plates 28 and 29 are attached to the stationary die carrier plate 11, while the plates 30 and 31 are attached to the movable die carrier frame 12. In the particular example of FIGS. 1 and 2, the stationary die half is composed of a sprue plate 28 and a mold cavity plate 29, and the movable die half is composed of a matching mold cavity plate 30 and an ejector plate 31.

To the rear of the movable die carrier frame 12 is attached the piston rod 16 of a power cylinder 14 which is mounted solidary with the stationary head plate 13, being clamped thereto by means of a number of cylinder tie rods 15. The centrally extending piston rod 16 carries on its forward end a thrust plate 22 with which it engages a pressure transfer wall 12b of the die carrier frame 12. This die carrier frame has an open center region between its pressure transfer wall 12b and a forwardly facing die mounting wall 12a, the two walls being longitudinally connected by means of four heavy guide sockets 12c surrounding the tie rods 20. Into the longitudinal bore of the guide socket 12c are pressed the earlier-mentioned guide bushings 24 and 25 which, by virtue of their axial spacing, give the movable die carrier frame a very precise, absolutely cant-free guidance on the four tie rods, for a reliable and accurate positioning of the die halves in the closed position. Such accuracy reflects itself in the consistency and quality of precision-injection-molded parts.

In the open central space of the movable die carrier frame 12 are visible various component parts of a hydraulic ejecting device. These include an ejector piston rod 17 of which the piston engages a bore inside the main piston rod 16, an ejector connecting rod 19 being attached to the piston rod 17 by means of an ejector coupling 18.

The four tie rods 20 are preferably identical and interchangeable, as well as reversible end-over-end. As the drawing indicates, the tie rods have a continuous diameter from end to end, interrupted only by a shallow groove 34 near the two extremities. Accordingly, the matching bores of the stationary plates of the movable die carrier frame and of the various die plates have all the same diameter. The attachment between the extremities of the tie rods 20 and the two stationary plates 11 and 13 is described in detail in my copending U.S. Pat. application Ser. No. 610,280, filed Sept. 4, 1975.

This attachment involves the use of a split abutment ring 33 which is placed into the shallow groove 34 of the tie rod 20 so as to engage its axially inwardly facing radial shoulder, thereby transmitting a pulling force on the tie rod 20 to the associated stationary plate which is engaged by the ring shoulder 16 of the split abutment ring 33. For oppositely directed forces, which occur during the opening of the die closing unit, but which involve considerably less strain on the connections, the end face of the tie rod 20 is engaged by a clamping cap 32, with clamping bolts 43 which exert an axial preload against the abutment connection for the pulling forces. This connection not only provides axial pressure transfer surfaces on the tie rods 20 which are located radially entirely within the diameter of the tie rod bores 20, it also provides a preloaded connection which is readily accessible for release, when the tie rods are to be retracted. In FIG. 1, one of the tie rods 20 is shown with both connections removed. In FIG. 2, all the tie rods are shown in a retracted position in which the tie rods are positioned axially outside the stationary die plates 28 and 29. The latter can now be removed sideways without difficulty. As can be seen in FIG. 2, the tie rods 20 could also be retracted in the opposite direction, including complete removal in either direction, although neither of these maneuvers is normally necessary.

The retraction of the tie rods 20 from their normal position shown in FIG. 1 can also be accomplished mechanically, by taking advantage of the mobility of the die carrier frame 12. For this purpose, the latter has attached to its rear side four narrow clamping collars 23 which are shown in FIGS. 4, 5, and 6. These clamping collars 23 are attached to the rear face of the die carrier frame 12 by means of short recessed screws 39. A clamping screw 38 extending between the two legs 23' of the split clamping collar serves to clamp the latter against the tie rod 20, through the intermediate of the bushing 24 which extends axially into the clamping collar 23. These clamping collars thus make it possible to temporarily attach the four tie rods 20 to the movable die carrier frame 12, with the result that, following release of the tie rod connections on both tie rod extremities, an opening or closing movement of the power cylinder entrains the four tie rods to execute the same movement. This feature not only offers a time saving method of retracting the tie rods, it also obviates the need for any special tie rod pulling tools, which would require extra space for their accommodation near the power cylinder 14.

Figure 3:
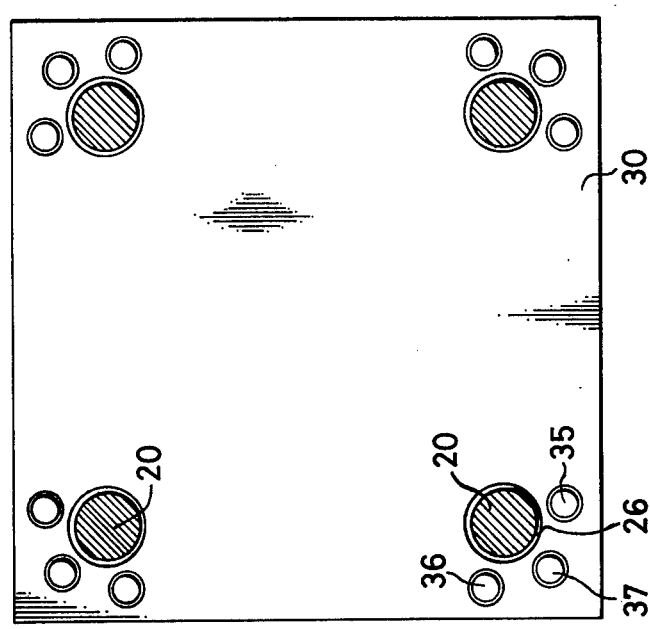
FIG. 3 shows an enlarged transverse cross section along line III—III of FIG. 2.

The attachment of the die plates to their respective carrier plates is exemplified by the attachment of the ejector plate 35 and mold cavity plate 30 to the movable die carrier frame 12, as is illustrated in FIGS. 3 and 4. The ejector plate 31 is first attached to the frame 12 by means of tie bolts 37, whereupon the mold cavity plate is clamped to the ejector plate 31, on the one hand, by means of the tie bolts 35, and to the die carrier frame 12, on the other hand, by means of the tie bolts 36. As can be seen in FIG. 3, the various tie bolts are arranged in the space between the tie rods 20 and the corner edges of the various plates, thereby occupying a cross-sectional space which is not effectively usable for the mold cavity.

Figure 7:
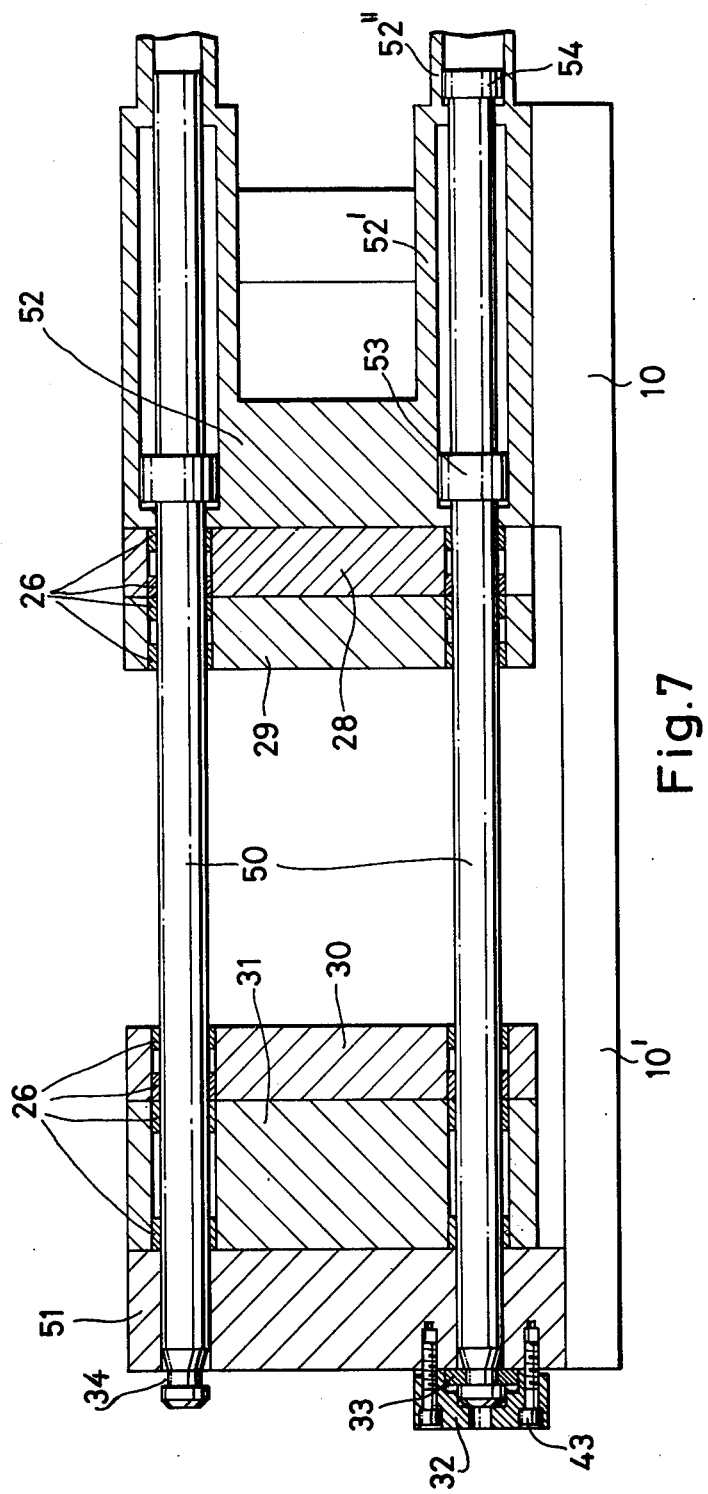
FIG. 7 represents a second embodiment of the invention in the form of a pull-type die closing unit which is shown in a longitudinal cross section.
Figure 8:
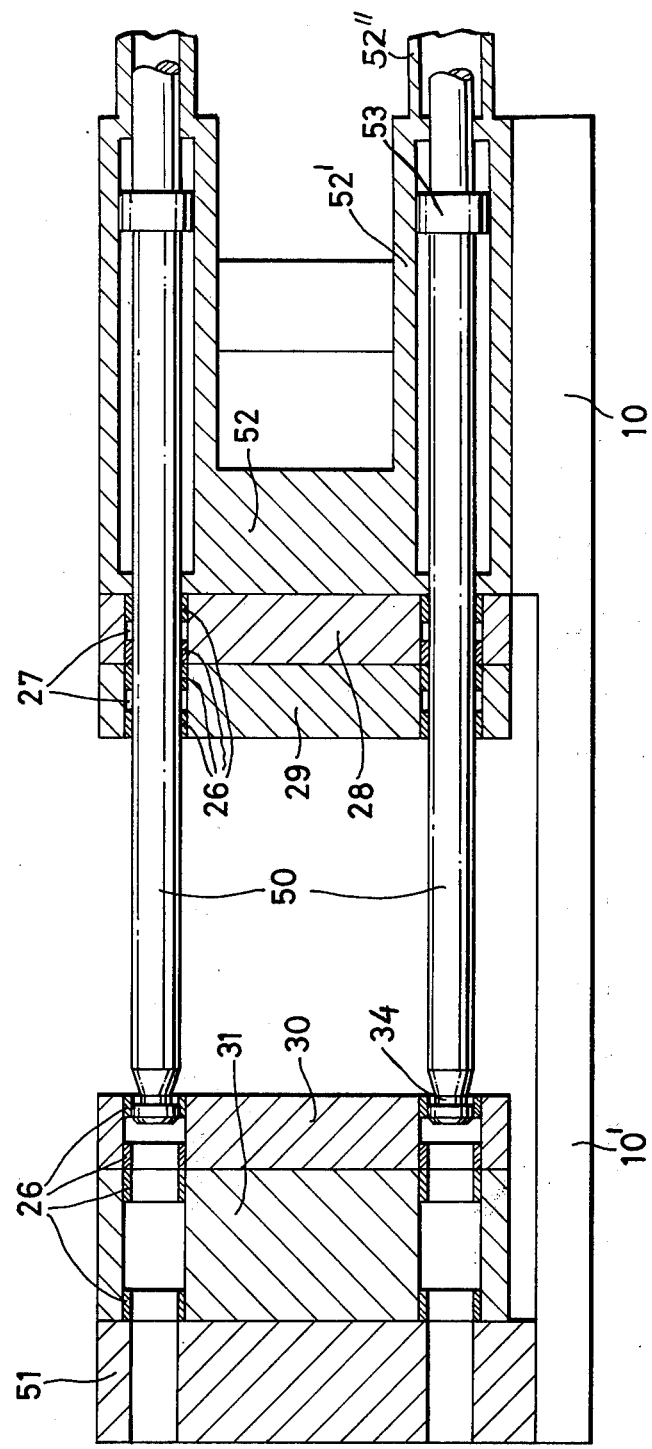
FIG. 8 shows the die closing unit of FIG. 7 with the tie rods disengaged and retracted from the movable die carrier plate.

Referring to FIGS. 7 and 8 of the drawing, there is shown a second embodiment of the invention in the form of a pull-type die closing unit. A heavy stationary die carrier plate 52 of the die closing unit is supported on the machine base 10, while a movable die carrier plate 51 is slidably supported on two support arms 10' which extend horizontally from the machine frame 10. Between these two die carrier plates is again arranged an injection molding die consisting of the die plates 28, 29, 30, and 31. The sprue plate 28 and one mold cavity plate are again stationary, since they are attached to the stationary die carrier plate 52. The other mold cavity plate 30 and the ejector plate 31 are movable, being carried by the movable die carrier plate 51. The latter receives its movement from the tie rods 50 which are attached to it and which are the extended piston rods of four hydraulic cylinders arranged behind the stationary die carrier plate 52. For this purpose, the latter has rearwardly extending cylinder sockets 52' with cylinder bores arranged therein, the cylinder sockets 52' and the stationary die carrier plate 52 forming preferably an integral cylinder mount. On each of the piston rods 50 is seated a large piston 53 which serves primarily for the generation of the required elevated closing pressure on the closed injection molding die. Auxiliary cylinders 52'', extending rearwardly from the main cylinders inside the sockets 52', accommodate smaller auxiliary pistons for the rapid opening and closing movements, viz. a differential piston 54 in one auxiliary cylinder for a rapid closing movement, and the piston rod itself in the other auxiliary cylinder for a rapid closing movement. The power pistons 53 have suitable flow bypass means (not shown) rendering them ineffective during the rapid opening and closing motions.

The far ends of the piston rods or tie rods 50 are attached to the movable die carrier plate 51 with the same kind of tie rod connection as was described further above in connection with the embodiment of FIGS. 1 and 2. As FIG. 8 indicates, these tie rods are likewise retractable axially, following the disconnection of the clamping cap 32 and removal of the split abutment collar 33 from the forward extremity of the tie rods 50, and following the retention of the movable die carrier plate 51 in its fully extended position with the help of suitable stops (not shown). The latter may be simple spacers which are positioned between the fully opened die plates.

In the foregoing it has been demonstrated that the retractable tie rods of the present invention are equally applicable to both push-type and pull-type die closing units, of which two examples have been described with reference to FIGS. 1–6 and FIGS. 7–8, respectively. It should be understood that the invention is similarly applicable to a second version of a push-type die closing unit, in which a knee linkage and a transversely oriented hydraulic power unit are used to create a spreading force between a stationary thrust plate and the movable die carrier plate of the die closing unit. Here again, the stationary die carrier plate at the forward end of the assembly and the stationary thrust plate at the rear of the assembly are connected together by means of longitudinal tie rods which thereby form a rigid guide frame with the stationary plates.

A number of other structural features are common to both the push-type and the pull-type die closing unit. Among them is fact that the same basic injection molding die can be used with either die closing unit, in some cases without modification. This will become apparent from a comparison between the embodiments of FIG. 1 and FIG. 7. In both cases, the ejector plate 31 and the mold cavity plate 30 are mounted on the movable die carrier member, viz. the frame 12 in FIG. 1, or the plate 51 in FIG. 7, respectively. The other mold cavity plate 29 and the supporting sprue plate 28 are accordingly always attached to the stationary die carrier plate, which is plate 11 in FIG. 1, or plate 52 in FIG. 7, respectively. However, the actual mounting configurations differ in the two cases, inasmuch as in one case the movable die plates slide on the stationary tie rods 20 (FIG. 1), and in the other case the tie rods 50 themselves move with the movable die plates, sliding instead in the stationary die plates 28 and 29. It is for this reason that all four die plates are equipped with guide bushings 26 and 27, respectively, even though only one die half executes a sliding motion relative to the tie rods. Each die plate is preferably provided with two axially spaced short bushings, leaving an annular space 27 therebetween. These annular spaces 27, as well as the annular spaces 44 between the bushings 24 and 25 of the movable die carrier frame 12, may be filled with a suitable lubricant.

Referring to FIGS. 9 through 12, there will now be shown how the arrangement of retractable tie rods in a push-type or pull-type die closing unit affects the cross-sectionally available space for the injection molding dies. In the examples used for this purpose, all the die plates are square in outline, and the four tie rods are arranged at the four corners of a correspondingly smaller square.

The outside dimensions of the various die plates are shown to be the same as those of the stationary and movable die carrier plates, but this need not be so. The retractability of the tie rods makes it possible to use die plates which are even larger than the die carrier plates, overhanging the latter on at least two sides. These enlarged die carrier plates are then preferably bolted together on their overhanging portions. Of course, the die carrier plates could be made larger still, by having them overhanging the supporting die carrier plates on three sides, or on all four sides.

In the schematic illustration of FIG. 9 is shown the effectively usable die area in accordance with the present invention, when at least three, and preferably all four tie rods are retractable. The contour of this area on the sprue plate 28 is defined by stippled lines, and the area itself is indicated by a double cross-hatching. By comparison, if one would want to mount the same size injection molding die in a die closing unit of conventional design, which does not have the retractable tie rods of the invention, one would have to use a considerably larger die closing unit having tie rods $20s'$ which, instead of being spaced apart by the distances $x$ and $y$, would have to be spaced apart by the distances $a$ and $b$, respectively. The die outline shown in FIG. 9 corresponds with the size of the die carrier plate behind it, but it should be understood that, as mentioned earlier, the effective die area could also be overhanging the die carrier plate, without the need for the tie rods 20 to extend through the die plates. The tie bolts 35–37 (which are not shown in FIG. 9) can be conveniently arranged near the eight outside corners of the die outline, without reducing the overall area which is available for the mold cavity.

In FIG. 10 is shown a modified outline of an injection molding die which can be used with the die closing unit of the invention. Here, the two diagonally oppositely located tie rods 20 reach through the plates of the injection molding die, while the other two tie rods $20s$ extend outside the contour of the die plates, along oblique facets of the latter. In this modification of the invention, only the two tie rods 20 need to be retracted for a removal of the sprue plate 28, the tie rods $20s$ remaining in place, attached to the stationary die carrier plate 11. The cross-sectional area which is occupied by this injection molding die is indicated by the cross-hatched area of FIG. 10. The retraction of only two diagonally oppositely located tie rods has the operational advantage of maintaining the die plates in rigid alignment with each other, while the two other tie rods are retracted.

Figure 11:
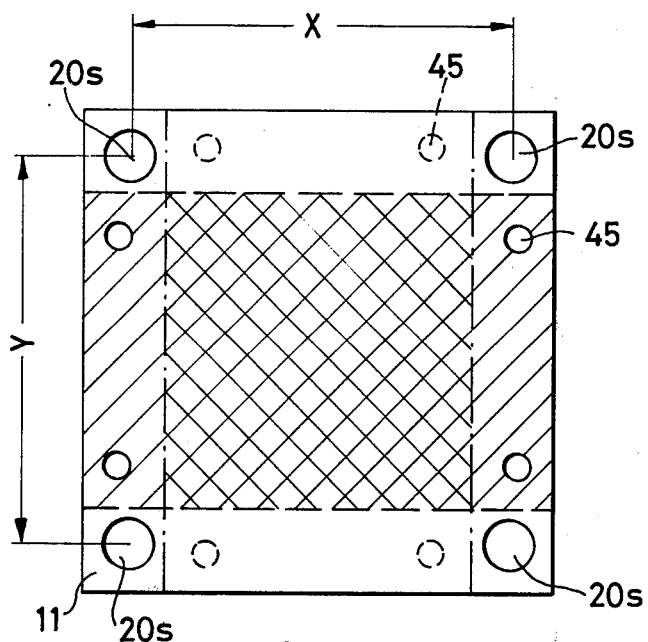
FIG. 11 shows, by way of comparison, outline dimensions of the prior art arrangement.

The representation of FIG. 11 indicates the limitations which are placed on the size of the injection molding die in connection with presently known die closing units, where the tie rods $20s$ are not retractable. At least one of the two cross-sectional dimensions of such a die is limited to the transverse width between two circumferentially adjacent tie rods, so that only the size of a rectangle, indicated in FIG. 11 by simple cross-hatching, is available for the maximum plate outline. This available area is further reduced by the need to accommodate therein the necessary centering and guide members 45 for the two die halves, so that the cross-sectional area which is effectively available for the mold cavities is essentially no greater than a square whose side length is equal to the distance between two tie rods $20s$. This area is indicated in FIG. 11 by a double cross-hatching.

Figure 12:
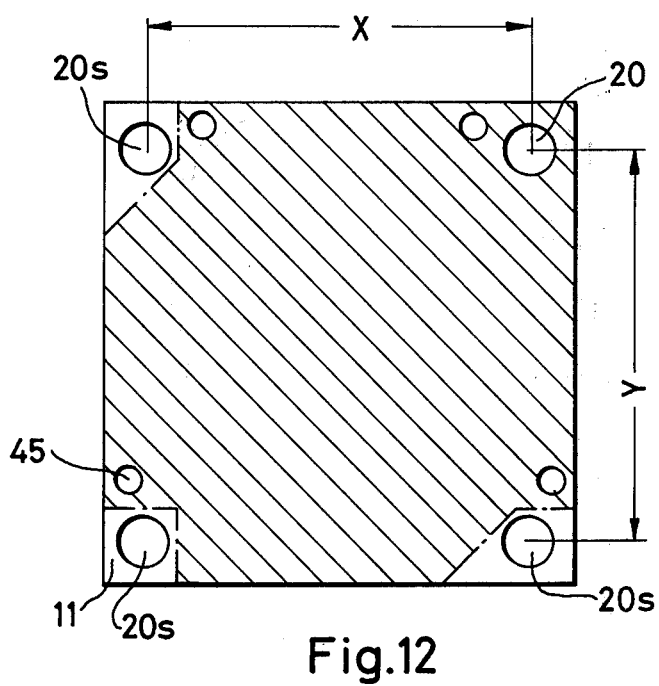
FIG. 12 is similar to FIGS. 9 and 10, showing a further modified outline of an injection molding die.

In FIG. 12 is illustrated a third version of a die plate contour, where only one of the four tie rods need to be retracted, in order to make it possible for the die plates to be removed transversely. The cross-sectional area of the die plates only needs to have two oblique facets for the two tie rods 20s which are circumferentially adjacent to the retractable tie rod 20, while a simple corner recess suffices for the fourth tie rod 20s. The necessary centering elements 45 are arranged in one of the outside corners opposite the centering bushings which embrace the retractable tie rod 20. The tie bolts for the attachment of the die plates are arranged in the other outside corners.

Although not specifically shown in the drawing, it should be obvious that the retractability of at least one tie rod also makes it possible to introduce a circular injection molding die of a much larger diameter than would be possible otherwise.

Whereas in the prior art die closing unit the diameter of such a die is limited to the distance between two circumferentially adjacent tie rods 20, this diameter can be increased, according to the invention, to the distance between two diagonally oppositely located tie rods, if one of the four tie rods is retracted. In the case of equidistant tie rods, this increase equals some 50 percent, since the tie rod distance in the diagonal sense is 41 percent greater, and both center distances have to be reduced by the tie rod diameter, in order to arrive at the available clearance between the rods.

It should be understood, of course, that the foregoing disclosure describes only preferred embodiments of the invention and that it is intended to cover all changes and modifications of these examples of the invention which fall within the scope of the appended claims.

I claim the following:

1. A die closing unit for an injection molding machine designed to produce plastic or metallic articles through the injection of suitable raw material into a multiplate injection molding die having a cavity, which die is to be opened and closed by means of said unit in a reciprocating straight-line axial motion, whereby the injection molding die is readily removable and interchangeable with another die, said die closing unit comprising in combination:

a first die carrier member having an axially oriented face for the attachment thereto of a constituent half of said injection molding die;

a second die carrier member spaced a distance from the face of the first member and having an oppositely oriented face for the attachment thereto of the other constituent half of the injection molding die in axial alignment with said first die half;

means for forcibly moving one of the two die carrier members towards and away from the other in a reciprocating die closing and opening motion;

means for axially guiding the movable one of the two die carrier members in relation to the stationary one, said means including at least two tie rods extending parallel to the unit axis, laterally outside and on opposite sides of the space occupied by the cavity of an injection molding die, each tie rod having one extremity rigidly connected to one of the two die carrier members and a central length portion thereof guidingly received in a guide bore of the other die carrier member; and wherein the rigid connections between the tie rod extremities and said one die carrier member are axially preloaded threadclamped connections; and at least one thusly rigid connected tie rod engages a connecting bore in said connected die carrier member with a configuration which permits release of the rigid connection and retraction of the tie rod through its connecting bore;

said retractable tie rod includes, as part of its releasable connection, an end portion which protrudes from the axially outer side of said connected die carrier member;

the protruding tie rod end portion defines an axial force transmitting surface which is facing inwardly towards said connected die carrier member and whose maximum diameter is not greater than the diameter of its connecting bore; and the retractable tie rod further includes, as part of its releasable connection, an abutment member which is axially engaged between said axial force transmitting surface and said connected die carrier member, and threaded means for axially preloading the tie rod against said connected die carrier member in the abutment sense of said abutment member.

2. A die closing unit as defined in claim 1, wherein the retractable tie rod further includes, as part of its releasable connection, an abutment groove in its protruding end portion, the axially outer flank of said groove defining said inwardly oriented force transmitting surface; and the abutment member is a split abutment ring engaging said groove flank with its outer axial side and an abutment face on the associated connected die carrier member with its inner axial side.

3. A die closing unit as defined in claim 2, wherein the retractable tie rod further includes, as part of its releasable connection, an axial end face at its protruding end portion defining an outwardly oriented force transmitting surface; and said axial preloading means includes a clamping cap engaging said axial end face of the tie rod, and at least one clamping bolt engaging said cap and a threaded bore in the associated connected die carrier member.

4. A die closing unit as defined in claim 1, wherein the means for forcibly moving one of the two die carrier members includes: a stationary thrust member mounted on the injection molding machine in axial alignment with the two die carrier members, on the same side of, and spaced from the movable one of the two die carrier members; and a hydraulic linear actuator connected to the movable die carrier member and capable of exerting an elevated pushing force against said member in the closing sense, while supporting itself against said stationary thrust member;

the tie rods extend longitudinally between the stationary die carrier member and the stationary thrust member, being rigidly connected by their extremities to both of said members, thereby defining with them a rigid guide frame;

the movable die carrier member, accordingly, has guide bores receiving therein said central length portion of the tie rods for guided movements therealong; and those retractable tie rods which are releasably connected to the stationary die carrier member are also releasably connected to the stationary thrust plate.

5. A die closing unit as defined in claim 4, wherein the hydraulic linear actuator is arranged in alignment with the axis of the unit and axially outside the stationary thrust plate, a piston rod of said actuator engaging the movable die carrier member; and the movable die carrier member includes means for temporarily connecting each retractable tie rod to said movable die carrier member, for the forcible retraction of said tie rod from its stationary member, under a displacement of the movable die carrier member, following the release of both connected extremities of said tie rod.

6. A die closing unit as defined in claim 5, wherein the movable die carrier member has fitted guide bushings in each guide bore, the bushings being comparatively short and axially spaced apart so as to form an annular space therebetween;

one of the bushings of each guide bore which is engaged by a retractable tie rod has an axial protrusion on one side of the die carrier member; and said temporary connecting means includes a clamping collar on said axial protrusion which is capable of being radially deformed so that it exerts a clamping action between it and the tie rod.

7. A die closing unit as defined in claim 5, wherein the movable die carrier member is a die carrier frame, having a pressure transfer wall to which the piston of the hydraulic linear actuator is attached, and an axially spaced die mounting wall for the attachment thereto of the movable die half, the two walls being connected by axially extending guide sockets accommodating therein the guide bore and guide bushings.

8. A die closing unit as defined in claim 1, wherein the means for forcibly moving one of the two die carrier members includes hydraulic linear actuators in axial alignment with the tie rods and arranged axially outside of and solidary with the stationary die carrier member, the tie rods being axial extensions of the piston rods of the linear actuators;

all tie rods are retractable tie rods, their distal extremities being releasably connected to the movable die carrier member, engaging connecting bores of the latter; and the stationary die carrier member has guide bores and guide bushings, receiving therein the piston rods.

9. A die closing unit as defined in claim 8, wherein the movable die carrier includes means for temporarily blocking its closing mobility for the retraction therefrom of the tie rods through a movement of the linear actuators, following the release of their connected extremities.

10. A die closing unit as defined in claim 1, further comprising a multi-plate injection molding die, of which one half is attached to the movable die carrier member and the other half is attached to the stationary die carrier member; and wherein the cross-sectional outline of the die plates, as projected onto a radial plane, is such that lateral removal of the die plates from the unit requires an axial retraction of at least one tie rod, following release of its connection.

11. A die closing unit as defined in claim 10, wherein the movable die carrier guiding means includes four tie rods arranged at the four corners of a quadrangle surrounding the injection molding die; and the outline of the die plates is such that all diametral dimensions of the plates are larger than the maximum opening between two circumferentially adjacent tie rods.

12. A die closing unit as defined in claim 11, wherein the four tie rods are equidistant, being arranged at the four corners of a square; and the outline of the die plates is circular, the plates having a diameter which is larger than the opening between two circumferentially adjacent tie rods, but smaller than the opening between two diagonally arranged tie rods.

13. A die closing unit as defined in claim 10, wherein the outline of the die plates is at least as large as the outline of their supporting die carrier members.

14. A die closing unit as defined in claim 13, wherein the die plates have radially open recesses in their outline, at the cross-sectional locations of the tie rods.

15. A die closing unit as defined in claim 13, wherein at least some of the die plates have guide bores and guide bushings fitted therein, at the cross-sectional locations of at least two tie rods, whereby said guide bores and tie rods cooperate to guide and center the die plates; and at least those tie rods which engage guide bores of the die plates are retractable tie rods, being releasable at their connected extremities and retractable axially out of the guide bores of at least one die half.

16. A die closing unit as defined in claim 10, wherein each die half of the injection molding die includes two axially contiguous die plates; and the die halves are interchangeably mountable on either the movable or the stationary die carrier member.

17. A die closing unit as defined in claim 16, wherein the die plates have a generally rectangular outline, at least as large as the outline of their supporting die carrier members;

the movable die carrier guiding means includes four tie rods arranged at the four corners of a square;

the die plates have guide bores and guide bushings at the cross-sectional locations of at least two tie rods, whereby said guide bores and tie rods cooperate to guide and center the die plates; and at least those tie rods which engage guide bores of the die plates are retractable tie rods, being releasable at their connected extremities and retractable axially out of the guide bores of at least one die half.

18. A die closing unit as defined in claim 17, wherein the outline of the die plates is larger than that of the supporting die carrier members, so as to create an overhang on at least two sides of said rectangle; and the die plates are bolted together in said overhanging areas.

* * * * *